United States Patent [19]
Galbraith, Jr.

[11] 3,735,681
[45] May 29, 1973

[54] FILM ADVANCE AND METERING MECHANISM

[75] Inventor: Floyd M. Galbraith, Jr., Rochester, N.Y.

[73] Assignee: Eastman Kodak Company, Rochester, N.Y.

[22] Filed: Oct. 4, 1971

[21] Appl. No.: 186,119

[52] U.S. Cl.............95/31 FM, 95/31 AC, 95/31 R
[51] Int. Cl.............................................G03b 19/04
[58] Field of Search...........95/31 FM, 31 R, 31 FS, 95/31 FL, 31 EL, 31 AC, 31 DS, 31 CA

[56] References Cited
UNITED STATES PATENTS

| | | | |
|---|---|---|---|
| 2,591,417 | 4/1952 | Frye | 95/31 FM |
| 3,580,152 | 5/1971 | Engelsmann | 95/31 FM |
| 1,909,597 | 5/1933 | Thompson | 95/31 FM |
| 2,584,964 | 2/1952 | Jacobson | 95/31 AC |
| 3,477,355 | 11/1969 | Kinder | 95/31 FS |
| 2,559,892 | 7/1951 | Mihalyi et al. | 95/31 FM |

Primary Examiner—Samuel S. Matthews
Assistant Examiner—E. M. Bero
Attorney—W. H. J. Kline and Milton S. Sales

[57] ABSTRACT

A camera for receiving roll film having a leader portion with closer than normally spaced perforations and an exposure portion. A pawl is adapted to sense the perforation spacing. Should that perforation spacing be that of the leader, the camera's shutter release mechanism cannot be activated and the film advance mechanism may be operated to advance more film into the take-up chamber. However, should the pawl sense normally spaced perforations, the film advancing mechanism is disabled and the shutter release mechanism may be activated to take a picture. After the last exposure frame, the film is perforated at the shorter distance to permit running off of the trailer and is finally perforated at a position to prevent further film movement.

10 Claims, 7 Drawing Figures

PATENTED MAY 29 1973 3,735,681

FLOYD M. GALBRAITH, JR.
INVENTOR.

BY *Milton S. Sales*
*H. H. J. Klenie*
ATTORNEYS 3,735,681
SHEET 2 OF 2
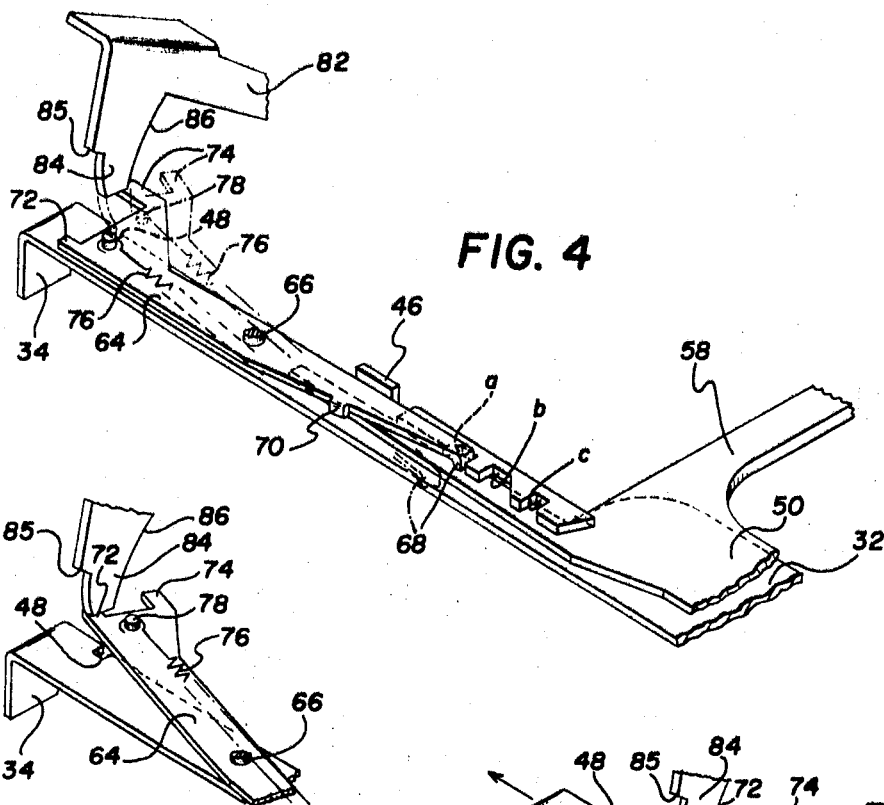
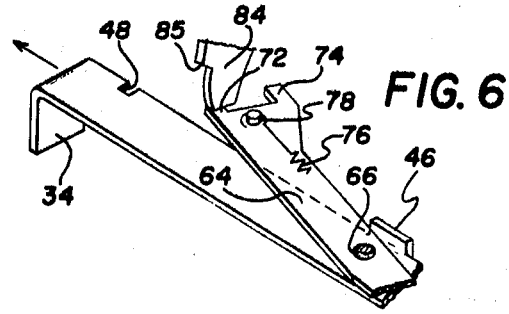
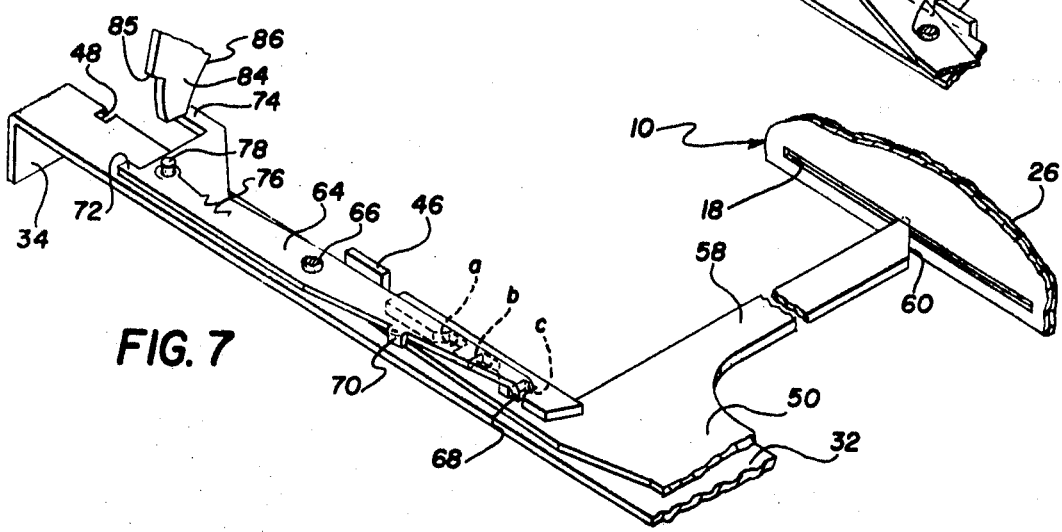
FLOYD M. GALBRAITH, JR.
INVENTOR.
BY *Milton S. Sales*
*W. H. J. Kline*
ATTORNEYS

3,735,681

FILM ADVANCE AND METERING MECHANISM

BACKGROUND OF THE INVENTION

1. Field of the Invention

This invention relates to devices for metering film in roll film cameras, and more particularly relates to such devices used in connection with roll film that is perforated at predetermined metering intervals.

2. Description of the Prior Art

Devices for metering successive roll film exposures by arresting the film winding mechanism in response to the sensing of perforations or notches precut in the film at specific chosen intervals are old and well known in the art. Coassigned U.S. Pat. No. 3,148,605, which issued Sept. 15, 1964 in the names of D. M. Peterson et al., shows a camera film metering mechanism which utilizes a sensing member which is held against a surface of the film. When the sensing member has (1) engaged a film perforation or notch and (2) been moved along in the direction of film travel by the film, it releases an independently biased locking pawl which moves at high velocity to engage and lock a ratchet wheel which is integral with the camera's film drive. Movement of the locking pawl also frees the camera's shutter release lever, permitting the exposure of the film by the operator.

In commercial applications, mechanisms such as disclosed in the Peterson et al. patent have proven to be highly successful and reliable. However, in such mechanisms it is necessary to attach the leading end portion of the film to a take-up core, and to advance the film past the camera's exposure area by turning the core. Metering is often accomplished by preventing core rotation when a perforation in the film has been sensed. Thus, if the film is loaded into the camera with a loose leading end portion, the operator must attach the leading end portion to the take-up core. In most commercial applications of this type of metering mechanism, the film is supplied to the camera in a double-chamber cartridge, such as for instance the commonly known size 126 cartridge. The cartridge includes a take-up core to which the leading end portion of the film has been attached at the factory.

SUMMARY OF THE INVENTION

It is an object of the present invention to provide a film advance and metering mechanism for a still camera wherein the leading end portion of the film need not be attached to a take-up core.

It is another object of the present invention to provide a film advance and metering mechanism for a still camera having a take-up chamber for receiving film which has been perforated or notched at predetermined intervals wherein a pawl is movable into succeeding film perforations and toward the take-up chamber to advance the film toward the take-up chamber.

It is still another object of the present invention to provide a film advance and metering mechanism for a camera adapted to receive roll film having perforations spaced apart by a greater distance in the exposure portion of the film than in the leader portion thereof wherein the film advance and metering mechanism includes means for sensing the interval between perforations in the portion of the film at the camera exposure area and for programming the camera's operation in accordance with the portion of the film at the exposure area.

In accordance with the above objects, one embodiment of the present invention includes a camera having means for receiving roll film of the type described. A pawl is adapted to fall into film perforations and to be moved in opposed directions parallel to the exposure plane, whereby the film is advanced by the pawl when the pawl is moved toward the take-up chamber. During the return stroke of the pawl, the length of travel of the pawl away from the take-up chamber before the pawl reaches the next perforation determines whether the shutter mechanism can be operated or whether the shutter mechanism is disabled.

The invention, and its objects and advantages, will become more apparent in the detailed description of the preferred embodiment presented below.

BRIEF DESCRIPTION OF THE DRAWING

In the detailed description of the preferred embodiment of the invention presented below, reference is made to the accompanying drawing in which:

FIG. 4 is a perspective view similar to FIG. 3 with the elements in their respective positions when film perforated at intervals greater than the predetermined distance is at the camera's exposure area;

FIG. 5 is a perspective view of the camera's double exposure prevention mechanism in its active position;

FIG. 6 is a view similar to FIG. 5 showing the apparatus for moving the camera's double exposure prevention mechanism to its inactive position; and FIG. 7 is a view similar to FIG. 3 with the camera elements in their respective positions after the film trailer has been run off.

DESCRIPTION OF THE PREFERRED EMBODIMENT

Because cameras are well known, the present description will be directed in particular to elements forming part of, or cooperating more directly with, apparatus in accordance with the present invention. It is to be understood that camera elements not specifically shown or described may take various forms well known to those skilled in the art.

Figure 1:
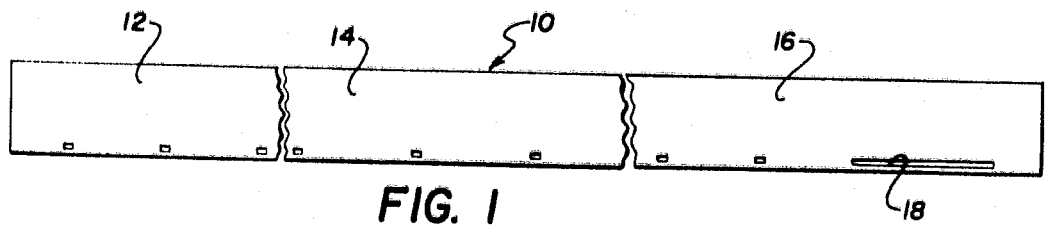
FIG. 1 is a view of a filmstrip perforated at various intervals for use in the camera of the present invention.

In FIG. 1, I have shown a filmstrip 10 having a leader portion 12, an exposure portion 14 and a trailer portion 16. The film is perforated along one edge. The perforations in the leader and trailer portions are spaced apart less than a predetermined distance, while the perforations in the exposure portion are spaced apart greater than the predetermined distance. At the very end of trailer portion 16, a long perforation 18 is provided, the distance between the leading edge of the long perforation and the trailing edge of its adjacent perforation being less than the distance between the perforations in the leader portion.

Figure 2:
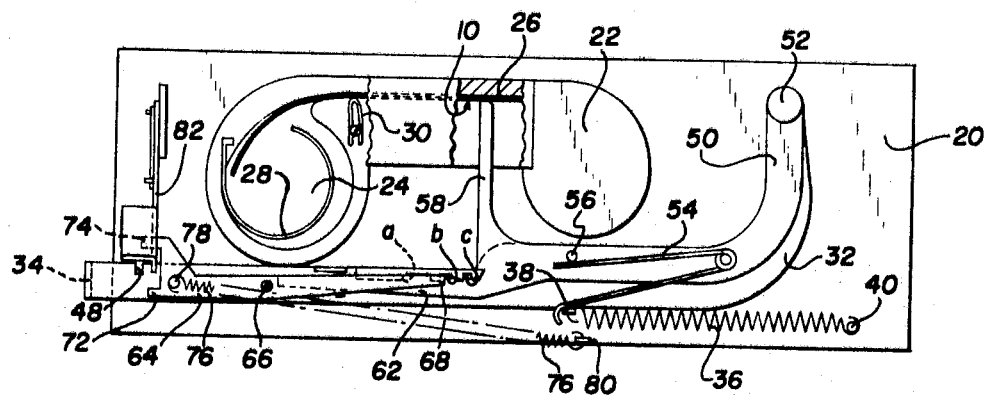
FIG. 2 is a top schematic view of a camera incorporating the film metering mechanism of the present invention.

Referring to FIG. 2, a camera includes a housing member or base 20 with a supply chamber 22 and a take-up chamber 24. Filmstrip 10 is threaded past an exposure area from the supply chamber to the take-up chamber. The film may be backed by opaque paper 26. The film roll may be supplied to the camera in any of several known forms such as for example on a supply spool, in a supply magazine or in a double-chamber cartridge. A coiled leaf spring 28 is provided in the take-up chamber to guide the film and prevent its cinching as the filmstrip is pushed into the take-up chamber in the manner to be described in detail hereinafter. An anti-backup spring 30 contacts one edge of the film surface to keep the film from slipping backward toward the supply chamber. Other types of anti-backup devices, such as for example a ball travelling in a wedge-shaped slot, will readily occur to those skilled in the art.

Figure 3:
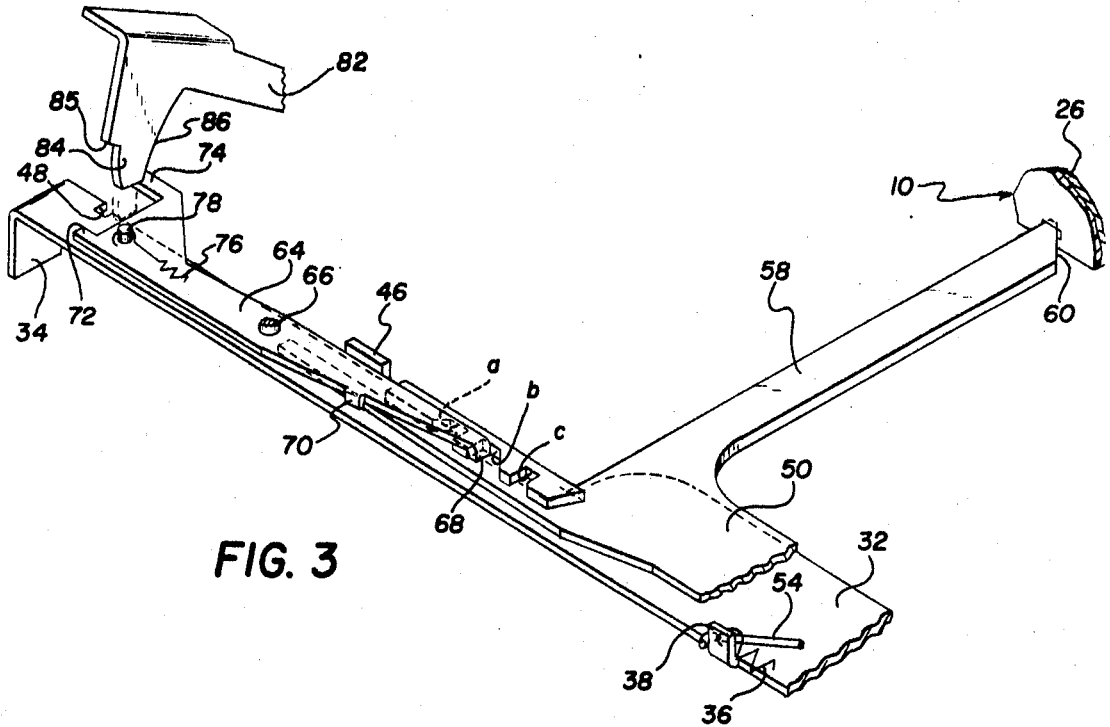
FIG. 3 is a perspective view of a portion of the film metering mechanism of the present invention with the elements in their respective positions when film perforated at less than the predetermined interval is at the camera's exposure area.

Referring now to FIG. 3 as well as FIG. 2, a film advancing member or slide 32 is manually movable by a handle 34 to the left as viewed in FIG. 2 against the bias of a spring 36 which is attached to a lug 38 on the slide and a post 40 on base 20. The slide has a disabling or locking member 42 with three notches $a$, $b$, and $c$ along one surface, each notch having a peculiar configuration, the purpose of which to be later described. Slide 32 has a tab 46 and is notched at 48.

A film sensing lever 50 is pivotally mounted on slide 32 at 52 and is urged for rotation in a clockwise direction about 52, as viewed in FIG. 2, by a torsion spring 54 having legs which abut a post 38 on slide 32 and a post 56 on lever 50. Lever 50 carries a pawl 58 which is urged into contact with the film surface by spring 54. The end of pawl 58 is beveled at 60. A leg 62 on lever 50 extends generally perpendicular to pawl 58.

A combination double exposure preventing means and stop member or lever 64 is pivotally mounted on a pin 66 which extends from base 20. Stop member 64 has a pair of tabs 68 and 70 extending downwardly therefrom and a pair of legs 72 and 74 extend to the left as viewed in FIG. 2. One end of a spring 76 is attached to a post 78 on stop member 64 and the other end of the spring is attached to a lug 80 on base 20. The function of this spring will be described hereinafter. Stop member 64 is pivotable about pin 66 between the position shown in FIGS. 2–4 and 7 and the position shown in FIGS. 5 and 6. Since spring 76 assumes a position on one or the other side of pin 66 depending on the position of stop member 64, the spring is effective to hold the stop member in whichever position it assumes.

Not shown, but readily within the understanding of those skilled in the art, a shutter release mechanism is provided for normally capping the camera's picture-taking aperture and is actuatable for selectively and momentarily uncapping the aperture to expose film at the film plane. The shutter release mechanism is operated by a shutter release lever 82 pivoted to camera base 20. Shutter release lever 82 has a protruding tab portion 84 which is aligned with slot 48 in slide 32 when the slide is in its extreme rightward position as shown in FIGS. 4 and 5. When slide 32 is in other than this position, the slot is not aligned with shutter release lever tab portion 84 so that a picture may not be taken. Further, leg 72 of stop member 64 aligns with tab portion 84 when member 42 is in the position shown in FIGS. 5 and 6 so that shutter release member 82 may not be depressed. Tab portion 84 has a cam surface 86 which cooperates with leg 74 of stop member 64 upon depression of shutter release lever 82 to move member 64 from its active position shown in FIGS. 2–4 and 7 to an intermediate position. Overcenter spring 76 moves stop member 64 from its intermediate position to its inactive position shown in FIGS. 5 and 6 when shutter release lever 82 is released.

OPERATION

Upon loading a roll of film into supply chamber 22, the leading end portion of the filmstrip is threaded past the camera's exposure area and into take-up chamber 24 inside of coil leaf spring 28. Of course, if the camera is adapted to receive double-cavity cartridges, the leading end portion of the film will already be in the take-up chamber and the leaf spring will be carried by the cartridge.

At this time, leader portion 12 of filmstrip 10 is at the exposure area of the camera, and metering pawl 58 may or may not be in its extended position in a film perforation. To advance the leader portion through the exposure area, handle 34 is pulled to the left to move slide 32 therewith against the force of spring 36. Locking member 42 on the slide moves with the slide member past tab 68 on stop member 64, the stop member being in its inactive position shown in FIGS. 5 and 6.

As metering pawl 58 finds a perforation as it travels across the film surface, the film (and backing paper, if any) will be moved therewith toward the take-up chamber. Handle 34 is continued to be pulled to the left until pawl 58 reaches a stop position whereat the handle may not be further advanced to the left. During its travel to the left, and after locking member 42 has passed stop member tab 68, tab 46 on slide 32 rotates stop member 64 in a counterclockwise direction until tab 70 rests on leg 62 of lever 50. Upon the release of the handle, spring 36 returns slide 32 to the right, pawl 58 being cammed out of the perforation by beveled surface 60. This rotates lever 50 in a counterclockwise direction about pivot 52 so that leg 62 of that lever pushes against tab 70 to keep tab 68 from falling into one of the notches in locking member 42.

During its return movement, metering pawl 58 rides along the surface of the film which is held stationary by spring 30. As long as the leader portion of the film is in the exposure area, the metering pawl will fall into the next succeeding perforation after it has travelled a distance from its stop position sufficient to align tab 68 and the center notch in locking member 42. As the metering pawl moves to its extended position transversing the film, lever 62 pivots in a counter-clockwise direction so that tab 68 falls into notch $b$ in locking member 42 as shown in FIGS. 2 and 3. Cooperation of this tab and the abutment surface of the notch will prevent metering pawl 58 and slide 32 from travelling further to the right.

As can be seen in FIGS. 2 and 3, slide 32 has not returned to its original position and notch 48 has not aligned with tab portion 84 of shutter release member 82 so that the shutter release member may not be depressed to take a picture. Since a picture may not be taken, cam member 86 cannot be activated to rotate lever 62 in a clockwise direction. Thus, the only thing that an operator can do is to again pull handle 34 thereby advancing more of the leader portion into the take-up chamber.

As the first film frame of the exposure portion 14 of filmstrip 10 is aligned with the exposure area of the camera, the metering pawl, upon returning from its stop position after advancing the last frame of the leader portion of the film past the exposure area, will advance to the left a distance sufficient to align tab 68 with notch *a* in locking member 42 before falling into a perforation (FIG. 4). Now the abutment surface of notch *a* cooperates with tab 68 to prevent the operator from pulling slide member 32 to the left. Slot 48 in slide 32 is aligned with tab portion 84 of shutter release lever 82 so that a picture may be taken. As member 82 is depressed, cam surface 86 pushes on leg 74 to rotate stop member 64 in a clockwise direction from its full line position to its phantom line position in FIG. 4. This removes tab 68 from notch *a*. The travel of member 82 is limited by abutment surface 85 engaging leg 72. Upon release of member 82, overcenter spring 76 causes stop member 64 to rotate further in a clockwise direction until leg 72 is below and in the path of tab portion 84 (FIG. 5) to prevent the operator from operating the shutter mechanism.

Now the operator can again pull handle 34 in slide member 32 to the left, causing pawl 58 to move therewith to advance film into take-up chamber 24. This operation may be repeated until all of the frames in the exposure portion of the film have been exposed.

Now upon return of slide 32 and pawl 58, the pawl will fall into the first perforation in trailer portion 16 of filmstrip 10 after moving a distance from the pawl's stop position sufficient to align tab 68 with the notch *b* in locking member 42. As the metering pawl moves to its extended position transversing the film, lever 62 pivots in a counterclockwise direction so that tab 68 falls into the notch *b* in locking member 42 to prevent actuation of the shutter release mechanism and to allow only further advancement of the film by movement of slide 32 to the left. Repeated operation of slide handle 34 runs off the remaining portion of the film trailer. At the end of the trailer, the metering pawl will fall into elongated perforation 18 in the film upon its return from its stop position. This will happen before tab 68 reaches locking member 42. As slide 32 continues to move to the right, tab 68 contacts a beveled portion of the locking member and is cammed thereby to ride over the locking member and to fall into notch *c* therein (FIG. 7). Now, the shutter release mechanism cannot be operated because notch 48 is not aligned with tab portion 84 and slide 32 can no longer be moved in either direction. Therefore, the film advance mechanism is completely "locked up." At this time, the operator can remove the roll of film for processing, and can reload the camera in the manner described above with a roll of fresh film.

The invention has been described in detail with particular reference to preferred embodiments thereof, but it will be understood that variations and modifications can be effected within the spirit and scope of the invention.

I claim:

1. In combination with a camera including (1) means for receiving a roll film having a leader portion perforated at first metering intervals less than a predetermined value and an exposure portion perforated at second metering intervals greater than said predetermined value, (2) a picture taking aperture, (3) means defining an exposure area at a film plane, and (4) a shutter mechanism for normally closing said aperture and actuatable for selectively and momentarily opening said aperture to expose film at said film plane; a film metering mechanism comprising:

film drive means for moving film across said film plane;

detection means for sensing the interval between metering perforations in the portion of film at said exposure area, said detection means having a first state upon sensing a film portion perforated at intervals less than said predetermined value and a second state upon sensing a film portion perforated at intervals greater than said predetermined value;

means for preventing actuation of said shutter mechanism when said detection means is in its first state;

means responsive to said detection means for releasably disabling said drive means when said detection means is in its second state; and means responsive to actuation of said shutter mechanism for releasing said disabling means until the next portion of film perforated at intervals greater than said predetermined value is sensed at said exposure area by said detection means.

2. The combination as defined in claim 1 wherein:

said film drive means includes (1) a member couplable to the film and movable from a first position toward a second position to advance film across said film plane, and (2) and abutment on said member facing generally toward said second position and movable with said member;

said disabling means includes (1) a stop member movable between an inactive position spaced from the path of said abutment and an active position in the path of said abutment to prevent movement of said member from its first position, and (2) means for moving said stop member to its active position when said detection means is in its second state.

3. The combination as defined in claim 2 wherein said means for releasing said disabling means comprises cam means interconnecting said shutter mechanism and said stop member for moving said stop member from its active position to its inactive position upon actuation of said shutter mechanism.

4. The combination as defined in claim 2 further comprising means for disabling said shutter mechanism to prevent actuation thereof when said stop member is in its inactive position.

5. The combination as defined in claim 2 further comprising means for disabling said shutter mechanism to prevent actuation thereof when said member couplable to the film is in other than its first position.

6. In combination with a camera including (1) means for receiving roll film having a leader portion with perforations spaced apart less than a predetermined distance and an exposure portion with perforations spaced apart greater than said predetermined distance, (2) a picture-taking aperture, (3) a film supply chamber, (4) a film take-up chamber, (5) means for defining an exposure plane across which film may be advanced from the supply to the take-up chambers, and (6) a shutter mechanism for normally closing said aperture and actuatable for selectively and momentarily opening said aperture to expose film at said exposure plane; a film metering mechanism comprising:

a pawl movable (1) in opposed directions perpendicular to the exposure plane between an extended position transversing the film when intercepting one of the film perforations and a retracted position on one side of the film, and (2) in opposed directions parallel to the exposure plane respectively toward and away from a stop position adjacent the take-up chamber;

means resiliently urging said pawl toward its extended position;

means for moving said pawl in said opposed directions toward and away from said stop position a distance at least as great as said predetermined distance, whereby the film is advanced by said pawl when it is in its extended position and is moved toward said stop position;

means effective upon movement of said pawl away from its stop position for limiting such movement of said pawl to less than said predetermined distance upon movement of said pawl to its extended position at a distance from said stop position less than said predetermined distance;

means for preventing actuation of said shutter mechanism upon movement of said pawl to its extended position at a distance from said stop position less than said predetermined distance; and means for releasably preventing movement of said pawl toward said stop position upon movement of said pawl to its extended position at a distance from said stop position greater than said predetermined distance.

7. The combination defined in claim 6 further comprising means for releasing said pawl movement preventing means upon actuation of said shutter mechanism.

8. The combination defined in claim 6 wherein:
said pawl moving means includes (1) a lever, and (2) means interconnecting said lever and said pawl, said lever being movable in a first direction to move said pawl toward said stop position and a second direction to move said pawl away from said stop position; and said means for limiting movement of said pawl away from said stop position comprises (1) an abutment surface on said lever, (2) a stop member movable between an inactive position spaced from the path of said abutment and an active position in the path of said abutment to limit movement of said lever in its second direction, and (3) means for moving said stop member to its active position upon movement of said pawl to its extended position at a distance from said stop position less than said predetermined distance.

9. The combination defined in claim 8 wherein said stop member moving means comprises:

a spring urging said stop member toward its active position; and abutment means on said stop member interconnected with said pawl for holding said stop member in its inactive position when said pawl is in its retracted position.

10. The combination defined by claim 8 wherein said means for preventing movement of said pawl toward said stop position comprises a second abutment surface on said lever, said second abutment surface facing said stop position and being being aligned with said stop member when (1) said stop member is in its active position and (2) said pawl is spaced from said stop position by a distance greater than said predetermined distance.

* * * * *